United States Patent [19]

Cremer et al.

[11] 4,276,343
[45] Jun. 30, 1981

[54] ACTIVE PHOSPHORUS NITRIDES CONTAINING HYDROXYL AND HALOGEN, AND PROCESS FOR MAKING THEM

[75] Inventors: Joseph Cremer, Hurth; Heink Harnisch, Cologne, both of Fed. Rep. of Germany

[73] Assignee: Hoechst Aktiengesellschaft, Fed. Rep. of Germany

[21] Appl. No.: 128,385

[22] Filed: Mar. 10, 1980

[30] Foreign Application Priority Data

Mar. 12, 1979 [DE] Fed. Rep. of Germany ....... 2909600

[51] Int. Cl.$^3$ ............................ B32B 7/00; D04B 1/00; C01B 21/06; C01B 25/00
[52] U.S. Cl. ......................... 428/254; 428/921; 8/116 P; 106/18.16; 106/18.17; 423/300; 423/302
[58] Field of Search ............... 423/300, 302; 8/116 P; 106/18.16, 18.17; 428/254

[56] References Cited

U.S. PATENT DOCUMENTS

| | | | |
|---|---|---|---|
| 3,012,908 | 12/1961 | Bilger | 106/18.16 |
| 3,669,633 | 6/1972 | Beinfest | 423/300 |
| 3,869,294 | 3/1975 | Lanier | 106/18.16 |
| 4,044,104 | 8/1977 | Cremer | 423/302 |
| 4,063,883 | 12/1977 | Hupfl | 8/116 P |
| 4,175,113 | 11/1979 | Fieldhouse | 423/300 |

FOREIGN PATENT DOCUMENTS 2159431  6/1973  Fed. Rep. of Germany ........... 423/302

*Primary Examiner*—Brian E. Hearn
*Attorney, Agent, or Firm*—Connolly and Hutz

[57] ABSTRACT

The invention provides active polymeric phosphorus nitrides containing hydroxyl and halogen. The halogen atoms and hydroxyl groups are linked to phosphorus, and the nitrides contain about 35 to 54 weight % of phosphorus, about 35 to 47 weight % of nitrogen, about 1 to 20 weight % of oxygen and about 0.1 to 8 weight % of chlorine.

8 Claims, 2 Drawing Figures

ACTIVE PHOSPHORUS NITRIDES CONTAINING HYDROXYL AND HALOGEN, AND PROCESS FOR MAKING THEM

The present invention relates to active polymeric phosphorus nitrides containing hydroxyl and halogen, the halogen atoms and hydroxyl groups being linked to the phosphorus atoms of the phosphorus nitrides which present a space-network structure, and to a process for making them.

The preparation of hydroxyl and halogen-containing phosphorus nitrides has already been described by J. R. VAN WAZER in "Phosphorus and Its Compounds", Interscience publishers, Inc., New York, vol. I, pages 309 and 320. As taught therein, ammonia or ammonium cloride is reacted at 150° to 200° C. under pressure or at 135° C. at atmospheric pressure in the presence of a solvent to give trimeric phosphonitrilic chloride of the formula $(PNCl_2)_3$ which is subjected to gentle hydrolysis with water and partially hydrolyzed to give a compound of the formula $P_3N_3Cl_4(OH)_2$ containing 41.4 weight% of halogen and 9.46 weight% of oxygen.

A further process for making phosphorus nitrides of the general formula $PN_x$, in which x stands for a number of 0.9 to 1.7, has been described in German "Offenlegungsschrift" 2 516 915, wherein a phosphorus halide is reacted with an excess of ammonia in gas phase, preferably at a temperature lying between the boiling point and sublimation point of the phosphorus halide, and the resulting reaction product is post-heated to temperatures of 950° C. until ammonia ceases to escape therefrom.

A variant of this latter process has been described in German "Offenlegungsschrift" No. 2 608 018. The variant relates to the production of phosphorus nitrides of high bulk density and provides for the hot reaction products to be quenched with water and for phosphorus nitride to be separated from the suspension. In the processes described in German "Offenlegungsschriften" No. 2 516 915 and 2 608 018, the phosphorus halides undergo complete ammonolysis so that phosphorus nitride of the general formula indicated above is exclusively obtained.

The present invention now provides active polymeric phosphorus nitrides containing hydroxyl and halogen, the halogen atoms and hydroxyl groups being linked to phosphorus, the present phosphorus nitride being characterized in that they contain about 35 to 54 weight% of phosphorus, about 35 to 47 weight% of nitrogen, about 1 to 20 weight% of oxygen, and about 0.1 to 8 weight% of chlorine.

The phosphorus nitrides of the present invention contain more preferably 37 to 45 weight% of phosphorus, 39 to 46 weight% of nitrogen, 3 to 12 weight% of oxygen and 0.3 to 5 weight% of chlorine.

The invention also relates to a process for making active polymeric phosphorus nitrides containing hydroxyl and halogen, of which the halogen atoms and hydroxyl groups are linked to phosphorus and which contain about 35 to 54 weight% of phosphorus, about 35 to 47 weight% of nitrogen, about 1 to 20 weight% of oxygen, and about 0.1 to 8 weight% of chlorine, which comprises: reacting a phosphorus chloride in vapor form with an excess of gaseous ammonia at a temperature within the range 250° to 500° C. with the resultant formation of a halogen-containing phosphorus nitride and ammonium chloride; separating by sublimation about 5 to 85 weight% of the ammonium chloride from the reaction mixture within the temperature range specified; cooling the remaining reaction product down to about 0° to 100° C.; treating it with water so as to dissolve residual ammonium chloride and partially to hydrolyze the halogen-containing phosphorus nitride; filtering off the phosphorus nitride and drying it.

It has been found preferable to react the phosphorus chloride with gaseous ammonia at a temperature within the range 300° to 450° C. and to separate by sublimation 20 to 70 weight% of produced ammonium chloride from the reaction mixture at a temperature within the range 350° to 490° C.

It has also turned out advantageous to cool the reaction mixture down to 20° to 60° C. and treat it with water over a period of 5 to 50 minutes, preferably 15 to 30 minutes. The treatment of the reaction product with water at 0° to 100° C., preferably 20° to 80° C., can be effected by digesting the reaction product in water followed by filtration or by scrubbing the reaction product with water. The reaction product is ultimately dried, e.g. at 100° C.

The polymeric nitride obtained as the final product has the halogen atoms and hydroxyl groups contained therein predominantly in the form of unbranched terminal side chains which are linked to the phosphorus atoms of the polymeric phosphorus nitride having a space-network structure.

The halogen and hydroxyl-containing phosphorus nitrides of the present invention are well adapted for use as agents imparting flame-retardant properties to cellulose fibers, and more especially to knitted goods, i.e. very light fabrics. Satisfactory flame-retardant properties could not be imparted heretofore to these latter cellulose fiber-based products with the use of real phosphorus nitrides such as those described in the art which have indeed turned out useful in normal and heavy fabrics only.

The present phosphorus nitrides can rapidly be tested for their qualification for use as flame-retardant agents in fibers of regenerated cellulose, especially in light fabrics by means of a screening test producing coarse yet reproducible results which can be relied upon in selecting useful representatives from among various phosphorus nitride specimens.

Figure 1:
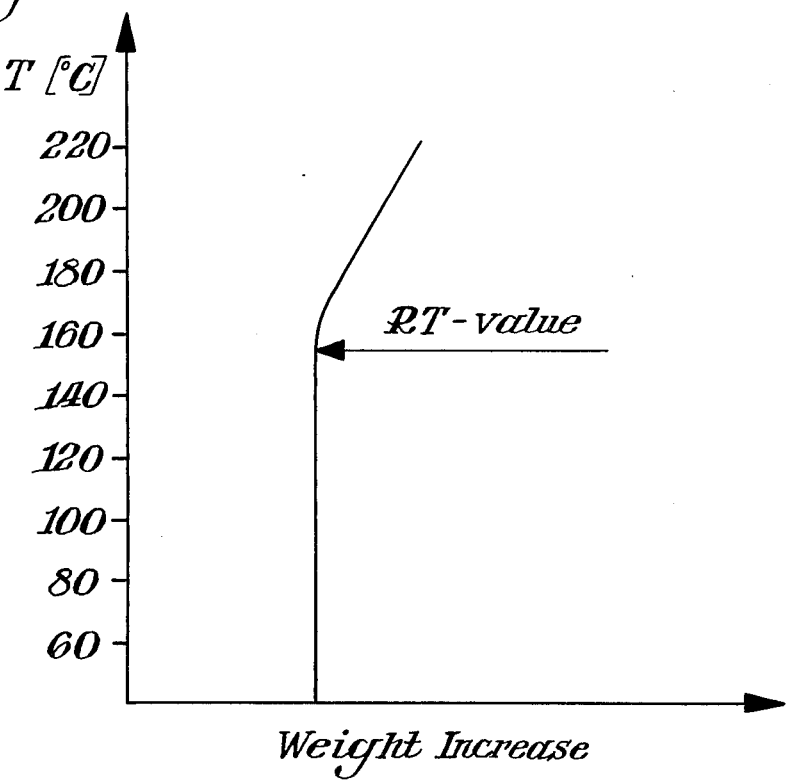
FIG. 1 indicates the increase in weight as a function of temperature of phosphorus nitride specimens in moist air.

The test is carried out as follows: A fine particulate phosphorus nitride specimen is placed on a thermobalance and heated in moist air, the temperature being continuously increased. At temperatures up to 100° C., the specimen practically undergoes no change in weight. At temperatures within the range 110° to 190° C., however, the specimen undergoes a spontaneous increase in weight which depends on the activity of the phosphorus nitride. Typical of the degree of activity of the specimen is the onset of spontaneous increase in weight or reaction temperature, briefly termed RT-value, determined at that particular moment. The increase in weight is a result of the reaction which phosphorus nitride undergoes with the oxygen and steam contained in the air, and during which the nitride is converted to ammonium polyphosphate. Indicated in FIG. 1 of the accompanying diagrams is the increase in weight, as a function of temperature, which a specimen underwent in a thermobalance. As can be seen, the RT-value of the specimen was at 155° C.

As regards phosphorus nitrides and their qualification for use as flame-retardant agents in light fabrics made from fibers of regenerated cellulose, it has been found that only those phosphorus nitrides which have a RT-value of 140° to 180° C., preferably 155° to 165° C., comply with the requirements of DIN-Specification 53 906 (DIN stands for German Industrial Standard). Products with a RT-value lower than 140° C. effect a breakdown of the chain in the cellulose molecule and products with a RT-value higher than 180° C. can be said to be inactive phosphorus nitrides. These are nitrides which permit satisfactory flame-retardant properties to be imparted to standard and heavy fabrics only, but do not permit satisfactory flame-retardant properties to be conferred upon light fabrics.

Figure 2:
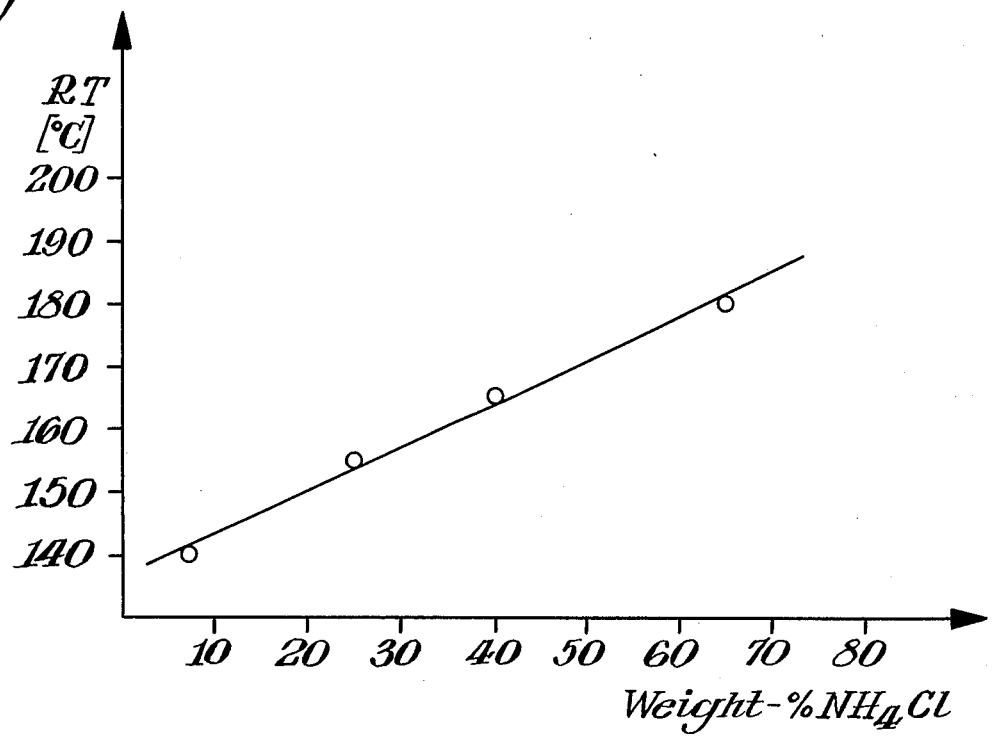
FIG. 2 correlates the RT-value of the present phosphorus nitrides and the quantity of ammonium chloride sublimed off from the reaction product.

Indicated in FIG. 2 of the accompanying diagrams is the correlation which exists between the RT-value of the present phosphorus nitrides and the quantity of ammonium chloride sublimed off from the reaction product of phosphorus chloride in vapor form with gaseous ammonia. As can be seen, the activity of phosphorus nitride decreases as the quantity of ammonium chloride which is sublimed off increases.

The present phosphorus nitrides permit flame-retardant properties to be imparted to light fabrics of fibers of regenerated cellulose and also to normal and heavy fabrics, and compare favorably in this respect with the phosphorus nitrides described heretofore.

EXAMPLE 1

$PCl_5$ was evaporated under nitrogen and introduced together with gaseous $NH_3$ into a coolable reactor, the $NH_3$ being used in a quantity necessary for resulting off-gas to always have $NH_3$ detectable therein. The reaction temperature was 300° C. The reaction product which was obtained in the form of a loose powder was after-heated under nitrogen in a rotating tube at 350° C. until approximately 7 weight% of ammonium chloride was found to have been sublimed off. Next, this intermediate product was placed in an agitator-provided vessel and admixed therein with the quantity of water necessary to ensure complete dissolution of ammonium chloride. Insoluble residue was filtered off and washed. The residue was dried at 100° C. and a colorless final product which contained 37 weight% of P, 39 weight% of N, 12 weight% of O and 10 weight% of Cl was obtained. The yield was 90 weight%, based on P. The product has an activity or RT-value of 140° C.

Light knitted material of fibers of regenerated cellulose treated with the product so made was subjected to the test described in DIN-Specification 53 906 and found to fully comply with the requirements set forth therein.

"Requirements not fully met" are the qualifying terms assigned hereinafter to material which did not comply with all of the requirements set forth in DIN-Specification 53 906, i.e. failed to comply with just one, e.g. burning period or tear length of knitted material after exposure to flame action for 3 and 15 seconds, respectively.

EXAMPLE 2 (Comparative Example)

$PCl_5$ was evaporated under nitrogen and introduced together with $NH_3$ into a coolable reactor, the $NH_3$ being used in a quantity necessary for resulting off-gas to always have free $NH_3$ detectable therein. The reaction temperature (in the gas phase) was maintained in the reactor at 180° to 200° C. by cooling. The reaction product was after-heated in a stream of nitrogen/hydrogen in a rotating tube at 700° C. Completely colorless phosphorus nitride containing 55 weight% of P and 43 weight% of N was obtained. The yield was 98 weight%, based on P. The product had an activity or RT-value of 200° C. Requirements of DIN-Specification 53 906 were not fully met.

EXAMPLE 3

The procedure was as in Example 1 but the reaction temperature was 350° C., the reaction product was afterheated at 400° C. and about 25 weight% of ammonium chloride was permitted to sublime off. The hydrolysis was effected over 40 minutes at 30° C. The dry final product contained 40 weight% of P, 41 weight% of N, 10 weight% of O and 8 weight% of Cl. The yield was 92 weight%, based on P and the product had an activity or RT-value of 155° C.

Knitted material treated with the product so made was subjected to the test of DIN-Specification 53906 and found to fully comply with the requirements set forth therein.

EXAMPLE 4

The procedure was as in Example 1, but the reaction temperature was 400° C., the reaction product was afterheated at 450° C. and about 40 weight% of ammonium chloride was permitted to sublime off. The hydrolysis was effected over 25 minutes at 60° C. The dry final product contained 42 weight% of P, 44 weight% of N, 8 weight% of O and 4 weight% of Cl. The yield was 93 weight%, based on P and the product has an activity or RT-value of 165° C.

Knitted material treated with the product so made was subjected to the test of DIN-Specification 53 906 and found to fully comply with the requirements set forth therein.

EXAMPLE 5

The procedure was as in Example 1, but the reaction temperature was 450° C., the reaction product was afterheated at 490° C. and about 65 weight% of ammonium chloride was permitted to sublime off. The hydrolysis was effected over 20 minutes at 70° C. The dry final product contained 48 weight% of P, 43 weight% of N, 4 weight% of O and 2 weight% of Cl. The yield was 91 weight%, based on P and the product has an activity or RT-value of 180° C.

Knitted material treated with the product so made was subjected to the test of DIN-Specification 53 906 and found to fully comply with the requirements set forth therein.

I claim:

1. Active polymeric phosphorus nitrides containing hydroxyl and halogen, the halogen atoms and hydroxyl groups being linked to phosphorus, the nitrides containing about 37 to 48 weight% of phosphorus, about 39 to 44 weight% of nitrogen, about 4 to 12 weight% of oxygen and about 2 to 10 weight% of chlorine.

2. A process for making active polymeric phosphorus nitrides containing hydroxyl and halogen, the halogen atoms and hydroxyl groups being linked to phosphorus and the nitrides containing about 37 to 48 weight% of phosphorus, about 39 to 44 weight% of nitrogen, about 4 to 12 weight% of oxygen, and about 2 to 10 weight% of chlorine, which comprises: reacting a phosphorus chloride in vapor form with an excess of gaseous ammonia at a temperature within the range 300° to 450° C. with the resultant formation of a halogen-containing phosphorus nitride and ammonium chloride; separating by sublimation about 5 to 85 weight% of the ammonium chloride from the reaction mixture at a temperature of 350° to 490° C.; cooling the remaining reaction product down to about 0° to 100° C.; treating it with water so as to dissolve residual ammonium chloride and partially to hydrolyze the halogen-containing phosphorus nitride; filtering off the phosphorus nitride and drying it.

3. The process as claimed in claim 2, wherein 20 to 70 weight% of ammonium chloride is permitted to sublime off.

4. The process as claimed in claim 2, wherein the reaction product is cooled down to 20° to 60° C. and treated with water of 0° to 100° C.

5. The process as claimed in claim 4, wherein the reaction product is treated with water of 20° to 40° C.

6. The process as claimed in claim 2, wherein the reaction product is water-treated over a period of 5 to 50 minutes.

7. The process as claimed in claim 6, wherein the reaction product is water-treated over a period of 15 to 30 minutes.

8. Light knitted goods of fibers of regenerated cellulose containing, as a flame-retardant agent, an active polymeric phosphorus nitride containing hydroxyl and halogen as claimed in claim 1.

* * * * *